United States Patent
Sekino (10) Patent No.: US 9,152,175 B2
(45) Date of Patent: Oct. 6, 2015

(54) DISPLAY DEVICE

(75) Inventor: Toshiharu Sekino, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 829 days.

(21) Appl. No.: 12/860,521

(22) Filed: Aug. 20, 2010

(65) Prior Publication Data

US 2011/0205032 A1 Aug. 25, 2011

(30) Foreign Application Priority Data

Feb. 25, 2010 (JP) .................................. 2010-040186

(51) Int. Cl.
*H04Q 3/00* (2006.01)
*G06F 1/16* (2006.01)
*F16M 11/04* (2006.01)

(52) U.S. Cl.
CPC ........... *G06F 1/1607* (2013.01); *F16M 11/046* (2013.01); *F16M 2200/028* (2013.01)

(58) Field of Classification Search
USPC ....................... 340/10.51, 10.6, 12.23, 12.24; 248/278.1, 282.1, 284.1, 286.1; 345/649; 361/679.01, 679.02, 679.5, 361/679.06, 679.7, 679.08, 679.21, 679.22, 361/679.23, 679.25, 679.55
See application file for complete search history.

(56) References Cited

U.S. PATENT DOCUMENTS

| | | | |
|---|---|---|---|
| 2,520,884 A * | 8/1950 | Laube | 248/231.71 |
| 2,709,565 A * | 5/1955 | Tousignant | 248/278.1 |
| 5,068,652 A * | 11/1991 | Kobayashi | 340/815.43 |
| 5,793,350 A * | 8/1998 | Chandavarkar et al. | 345/667 |
| 5,999,766 A * | 12/1999 | Hisatomi et al. | 399/80 |
| 6,007,036 A * | 12/1999 | Rosen | 248/286.1 |
| 6,189,842 B1 * | 2/2001 | Bergeron Gull et al. | 248/125.1 |
| 6,233,139 B1 * | 5/2001 | Hamon | 361/679.07 |
| 6,381,125 B1 * | 4/2002 | Mizoguchi et al. | 361/679.08 |
| 6,657,853 B2 * | 12/2003 | Oba et al. | 312/223.2 |
| 6,680,843 B2 * | 1/2004 | Farrow et al. | 361/679.02 |
| 6,837,469 B2 * | 1/2005 | Wu et al. | 248/278.1 |
| 6,915,996 B2 * | 7/2005 | Lin | 248/288.51 |
| 6,966,532 B2 * | 11/2005 | Ishizaki et al. | 248/274.1 |
| 7,000,878 B2 * | 2/2006 | Lin | 248/276.1 |
| 7,121,514 B2 * | 10/2006 | Twyford | 248/177.1 |
| 7,124,984 B2 * | 10/2006 | Yokouchi et al. | 248/125.8 |
| 7,159,828 B1 * | 1/2007 | Yau et al. | 248/125.8 |

(Continued)

FOREIGN PATENT DOCUMENTS

| | | | | |
|---|---|---|---|---|
| DE | 19754020 A1 * | 3/1999 | ............ | F16M 11/24 |
| EP | 1783419 A2 * | 5/2007 | ............ | F16M 11/24 |

(Continued)

*Primary Examiner* — Paul Obiniyi
(74) *Attorney, Agent, or Firm* — Amin, Turocy & Watson, LLP (57) ABSTRACT

According to one embodiment, a display device includes a display unit and a mounting stand. The display unit has a housing, a display panel housed at least partially within the housing, an engaging member joined to the housing at a first predetermined location and a processing unit configured to control the display panel to display a position indicator at a second predetermined location substantially corresponding in height to the first predetermined location. The mounting stand has a plurality of engaging parts disposed at different heights for engagement with the engaging member and a plurality of position marks disposed at third predetermined locations, the third predetermined locations being respectively at the different heights and visible when the display unit is mounted on the mounting stand.

17 Claims, 7 Drawing Sheets

(56) References Cited

U.S. PATENT DOCUMENTS

| | | | |
|---|---|---|---|
| 7,168,665 B2 * | 1/2007 | Hong et al. | 248/125.1 |
| 7,180,731 B2 * | 2/2007 | Titzler et al. | 361/679.22 |
| 7,293,747 B2 * | 11/2007 | Wang et al. | 248/125.2 |
| 7,395,992 B2 * | 7/2008 | Jung | 248/176.3 |
| 7,430,113 B2 * | 9/2008 | McRight et al. | 361/679.55 |
| 7,494,104 B2 * | 2/2009 | Baek | 248/372.1 |
| 7,611,103 B2 * | 11/2009 | Ha et al. | 248/125.2 |
| 7,631,841 B1 * | 12/2009 | Yen et al. | 248/121 |
| 7,663,868 B1 * | 2/2010 | Lam | 361/679.06 |
| 7,690,620 B2 * | 4/2010 | Lee | 248/676 |
| 7,694,919 B2 * | 4/2010 | Lee | 248/123.11 |
| 7,694,920 B2 * | 4/2010 | Lien et al. | 248/125.8 |
| 7,708,243 B2 * | 5/2010 | Wang et al. | 248/157 |
| 7,715,180 B2 * | 5/2010 | Titzler et al. | 361/679.23 |
| 7,726,616 B2 * | 6/2010 | Zhang et al. | 248/284.1 |
| 7,731,137 B2 * | 6/2010 | Lee et al. | 248/157 |
| 7,789,354 B2 * | 9/2010 | Gan et al. | 248/125.8 |
| 7,789,363 B2 * | 9/2010 | Duan | 248/284.1 |
| 7,793,897 B2 * | 9/2010 | Wang et al. | 248/125.2 |
| 7,793,903 B2 * | 9/2010 | Dittmer et al. | 248/276.1 |
| 7,839,626 B2 * | 11/2010 | Chen et al. | 361/679.07 |
| 7,841,567 B2 * | 11/2010 | Wang | 248/136 |
| 7,918,426 B2 * | 4/2011 | Short et al. | 248/276.1 |
| 7,975,975 B2 * | 7/2011 | Lee | 248/278.1 |
| 7,988,113 B2 * | 8/2011 | Yang et al. | 248/276.1 |
| 8,009,414 B2 * | 8/2011 | Ishida et al. | 361/679.25 |
| 8,011,632 B2 * | 9/2011 | Wang et al. | 248/284.1 |
| 8,033,513 B2 * | 10/2011 | Jang et al. | 248/122.1 |
| 8,047,480 B2 * | 11/2011 | Lien et al. | 248/162.1 |
| 8,047,489 B2 * | 11/2011 | Watanabe | 248/292.14 |
| 8,074,950 B2 * | 12/2011 | Clary | 248/280.11 |
| 8,081,261 B2 * | 12/2011 | Honda et al. | 348/836 |
| 8,172,186 B2 * | 5/2012 | Tsai et al. | 248/121 |
| 8,201,782 B2 * | 6/2012 | Fan | 248/125.8 |
| 8,201,784 B2 * | 6/2012 | Tang et al. | 248/162.1 |
| 8,282,064 B2 * | 10/2012 | Li | 248/372.1 |
| 8,300,393 B2 * | 10/2012 | Mathews | 361/679.22 |
| 2003/0063432 A1 * | 4/2003 | Farrow et al. | 361/680 |
| 2003/0103324 A1 * | 6/2003 | Gallivan | 361/681 |
| 2004/0011932 A1 * | 1/2004 | Duff | 248/157 |
| 2004/0118987 A1 * | 6/2004 | Matko et al. | 248/282.1 |
| 2004/0135050 A1 * | 7/2004 | Lee et al. | 248/317 |
| 2004/0149873 A1 * | 8/2004 | Ishizaki et al. | 248/274.1 |
| 2004/0217244 A1 * | 11/2004 | Wu et al. | 248/278.1 |
| 2005/0205725 A1 * | 9/2005 | Yokouchi et al. | 248/125.1 |
| 2005/0236533 A1 * | 10/2005 | McRight et al. | 248/161 |
| 2005/0270732 A1 * | 12/2005 | Titzler et al. | 361/681 |
| 2006/0024637 A1 * | 2/2006 | Raby et al. | 433/24 |
| 2006/0117623 A1 * | 6/2006 | Watanabe | 40/606.15 |
| 2006/0143932 A1 * | 7/2006 | Chung | 33/333 |
| 2006/0168865 A1 * | 8/2006 | Watanabe | 40/745 |
| 2007/0013720 A1 * | 1/2007 | McRight et al. | 345/649 |
| 2007/0018062 A1 * | 1/2007 | Calinescu | 248/220.21 |
| 2007/0029105 A1 * | 2/2007 | Liang et al. | 174/135 |
| 2007/0029457 A1 * | 2/2007 | Baek | 248/372.1 |
| 2007/0131833 A1 * | 6/2007 | Maloney et al. | 248/278.1 |
| 2007/0146981 A1 * | 6/2007 | Titzler et al. | 361/681 |
| 2007/0158510 A1 * | 7/2007 | Jung | 248/176.1 |
| 2007/0158516 A1 * | 7/2007 | Huang | 248/284.1 |
| 2007/0181673 A1 * | 8/2007 | Rietveld | 235/380 |
| 2007/0222610 A1 * | 9/2007 | Tagato | 340/572.7 |
| 2008/0123265 A1 * | 5/2008 | Ohlinger | 361/681 |
| 2008/0137273 A1 * | 6/2008 | Li et al. | 361/681 |
| 2008/0223926 A1 * | 9/2008 | Miller et al. | 235/382 |
| 2008/0237414 A1 * | 10/2008 | Lien et al. | 248/125.2 |
| 2008/0255794 A1 * | 10/2008 | Levine | 702/141 |
| 2008/0266768 A1 * | 10/2008 | Drew | 361/681 |
| 2008/0302926 A1 * | 12/2008 | Cheng et al. | 248/161 |
| 2009/0025022 A1 * | 1/2009 | Blatchley et al. | 725/9 |
| 2009/0146024 A1 * | 6/2009 | Duan | 248/157 |
| 2009/0166501 A1 * | 7/2009 | Wang et al. | 248/419 |
| 2009/0294523 A1 * | 12/2009 | Marano et al. | 235/380 |
| 2010/0039755 A1 * | 2/2010 | Chen | 361/679.01 |
| 2010/0072329 A1 * | 3/2010 | Zhang et al. | 248/122.1 |
| 2010/0128425 A1 * | 5/2010 | Chen et al. | 361/679.07 |
| 2010/0214730 A1 * | 8/2010 | Titzler et al. | 361/679.21 |
| 2010/0309615 A1 * | 12/2010 | Grey et al. | 361/679.01 |
| 2010/0321869 A1 * | 12/2010 | Fujikawa et al. | 361/679.01 |
| 2011/0011996 A1 * | 1/2011 | Cheng et al. | 248/216.4 |
| 2011/0012001 A1 * | 1/2011 | Cheng et al. | 248/294.1 |
| 2011/0058322 A1 * | 3/2011 | Lee et al. | 361/679.01 |
| 2011/0199719 A1 * | 8/2011 | Perez | 361/679.01 |
| 2011/0235248 A1 * | 9/2011 | Huang et al. | 361/679.01 |
| 2011/0255222 A1 * | 10/2011 | Fan | 361/679.01 |
| 2012/0019990 A1 * | 1/2012 | Segar et al. | 361/679.01 |
| 2012/0099250 A1 * | 4/2012 | Robinson et al. | 361/679.01 |
| 2012/0176219 A1 * | 7/2012 | Fiorucci et al. | 340/5.61 |
| 2012/0222101 A1 * | 8/2012 | Iwasaki et al. | 726/7 |

FOREIGN PATENT DOCUMENTS

| | | | | |
|---|---|---|---|---|
| EP | 1821027 A2 * | 8/2007 | | F16M 11/04 |
| JP | 07334096 A * | 12/1995 | | G09F 9/00 |
| JP | 11071088 | 3/1999 | | |
| JP | 2005115403 | 4/2005 | | |
| JP | 2006119563 A * | 5/2006 | | |
| JP | 2007171966 A * | 7/2007 | | |

* cited by examiner

DISPLAY DEVICE

CROSS-REFERENCE TO RELATED APPLICATIONS

This application is based upon and claims the benefit of priority from Japanese Patent Application No. 2010-040186, filed on Feb. 25, 2010, the entire contents of which is incorporated herein by reference.

FIELD

Embodiments described herein relate generally to a display device having a display unit that lends itself to the adjustment of the height at which the display unit is mounted on the display device.

BACKGROUND

Most of the recent display devices, such as PC monitors, POS terminals, television sets, etc., may have a tilting mechanism that enables the display devices to be tilted for a users' convenience. With the tilting mechanism, the display devices can be tilted differently depending on the physique of the user who is operating the display device. For example, if the user of the display device has a large physique, he may tilt it upward. On the other hand, the user of the display device who has a small physique may tilt it downward. However, the tilting mechanism has proved to have limited efficiency for a display device such as an LCD (Liquid Crystal Display) since the LCD, if tilted, may provide an indistinct view to the users.

To address the above problem, a height adjustment mechanism of the LCD has been developed. According to the mechanism, the height at which the user views the LCD may be adjusted by engaging the LCD to one of a plurality of hook fixtures provided at different heights on a wall. However, such mechanism may suffer from the disadvantage that for the height adjustment, the plurality of hook fixtures must be provided on a wall in advance. Another problem associated with the mechanism is that the users must look at the back side of the LCD prior to adjusting the height.

DETAILED DESCRIPTION

According to one embodiment, a display device includes a display unit and a mounting stand. The display unit has a housing, a display panel housed at least partially within the housing, an engaging member joined to the housing at a first predetermined location and a processing unit configured to control the display panel to display a position indicator at a second predetermined location substantially corresponding in height to the first predetermined location. The mounting stand has a plurality of engaging parts disposed at different heights for engagement with the engaging member and a plurality of position marks disposed at third predetermined locations, the third predetermined locations being respectively at the different heights and visible when the display unit is mounted on the mounting stand.

Embodiments will now be described in detail with reference to the accompanying drawings.

Figure 1:
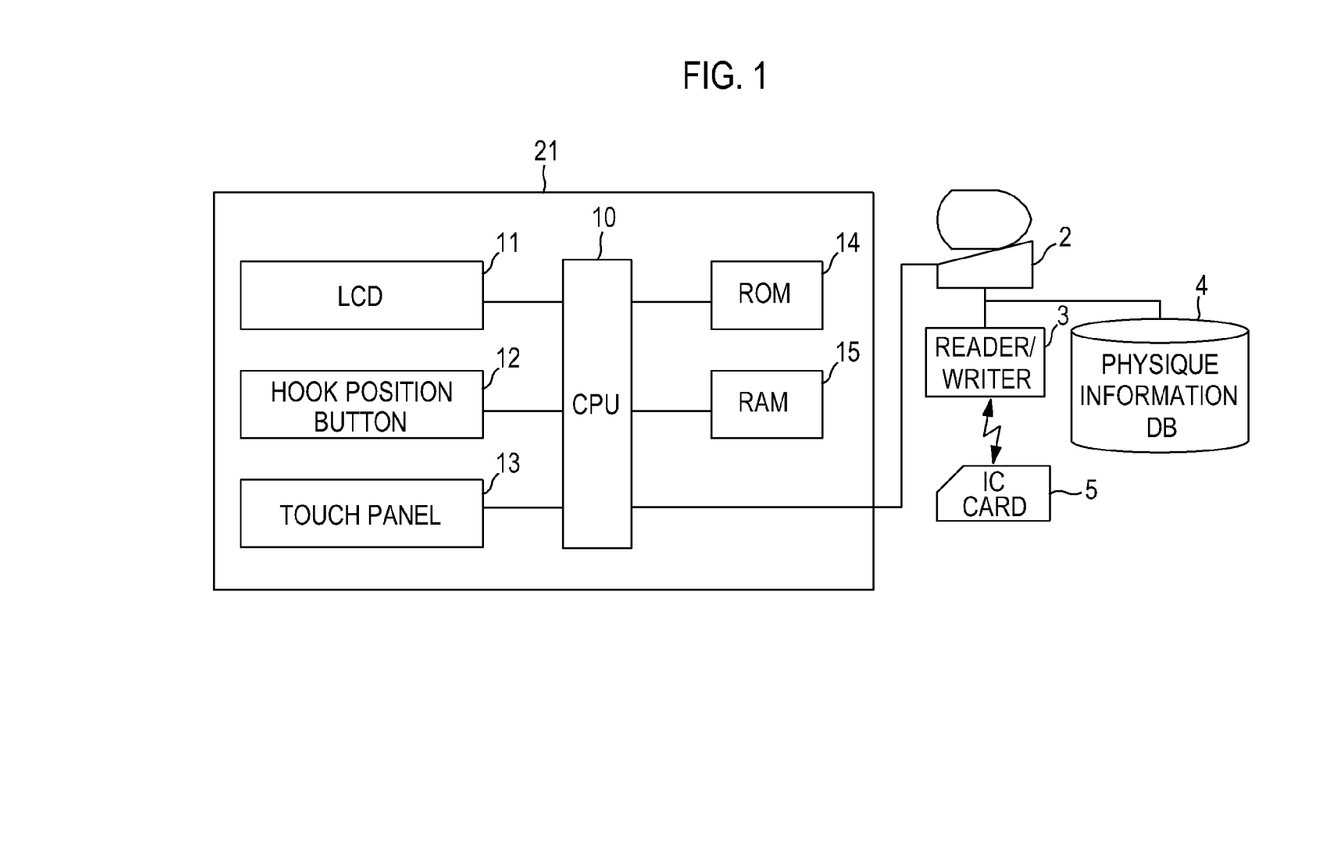
FIG. 1 is an illustrative embodiment of a block diagram of a display unit of a display device.

FIG. 1 is an illustrative embodiment of a block diagram of a display unit of a display device. As shown in FIG. 1, the display device 1 may include a display unit 21. The display unit 21 may include a liquid crystal display (LCD) 11 constructed of a display panel, a hook position button 12, a ROM 14 and a RAM 15 (storage unit); and a CPU 10 (processing unit). In one embodiment, the display unit 21 may optionally include a touch panel 13. The CPU 10 may be connected to the LCD 11, the hook position button 12, the touch panel 13, the ROM 14 and the RAM 15. In one embodiment, the display panel of the LCD 11 may include, but is not limited to, a plasma display or an OLED (Organic Light Emitting Diode) display.

The hook position button 12 may be provided on a housing of the display unit 21, within which at least part of the display panel may be housed. In one embodiment, the hook position button 12 may be provided on the front side of the housing. When the hook position button 12 is pressed down, the CPU 10 may control the LCD 11 to display a hook position.

The CPU 10 may be connected to an information processing device 2, such as a personal computer, a work station, a POS terminal, etc. via an interface. The information processing device 2 may be connected to a reader/writer 3 and a physique information database 4. The reader/writer 3 may be operable to read and write data from and to an IC card 5 having a wireless tag. The physique information database (DB) 4 may store users' physique information (e.g., a sitting height), preference information indicating the respective users' preference for a particular hook position, etc. in association with IDs, each of which is uniquely assigned to one of the users. In an embodiment where the physique information relates to a sitting height, the physique information DB 4 may store the physique information in the following manner if a sitting height of a particular user is equal to or more than a first predetermined value, the physique information for that particular user may be set to "UP" in the physical information DB 4; if a sitting height for a particular user is less than the first predetermined value and equal to or more than a second predetermined value, the physique information for that particular user may be set to "M" in the physical information DB 4; and if a sitting height is less than the second predetermined value, the physique information may be set to "LO" in the physical information DB 4.

If a user ID is inputted through a keyboard connected to the information processing device 2 or is read in from the IC card 5 through the reader/writer 3, the information processing device 2 may search the physique information DB 4 by using the user ID as a search key and may then read out the physique information stored in association with the user ID. The information processing device 2 may transmit the read physique information to the CPU 10 of the display unit 21.

The CPU 10 of the display unit 21 may control the ROM 14 to store the physique information that is received from the information processing device 2. When the hook position button 12 is pressed down, the CPU 10 may compute a hook position based on the physique information and may then control the LCD 11 to display the hook position by a hook position mark 26, which will be described later.

In an embodiment where the physique information relates to a sitting height, the CPU 10 may control the LCD 11 to display a message indicating a hook position, i.e., where to mount the display unit 21, based on the read physique information. The hook position indicated by the message may differ depending on the physique information. For example, the LCD 11 may display a message, "PLEASE ADJUST DISPLAY UNIT TO M." While in the embodiment explained above, the hook position has been explained to be determined based on the physique information, in other embodiments it is possible where the hook position may be determined based on the preference information indicating the user's preference for a particular hook position, etc.

Figure 2:
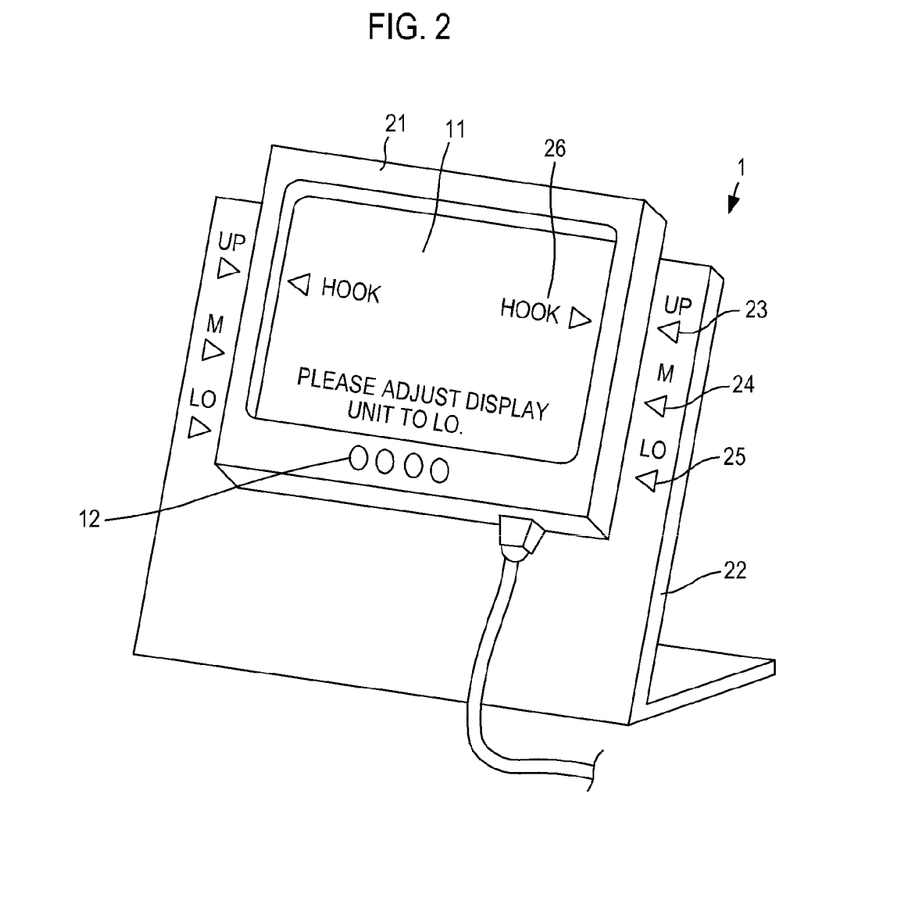
FIG. 2 is an illustrative embodiment of a perspective view showing an outer configuration of the display device.

FIG. 2 is an illustrative embodiment of a perspective view showing an outer configuration of the display device. As shown in FIG. 2, the display device 1 may include the display unit 21 and a mounting stand 22 configured to support the display unit 21 thereon.

When the hook position button 12 is pressed down, the display unit 21 may display the hook position mark (position indicator) 26. In one embodiment, the hook position mark 26 may include a symbol, such as a triangle, an arrow, etc. In one embodiment, the hook position mark 26 may include letters, such as "HOOK," in addition to the symbol. The hook position mark 26 may indicate the position where an engaging member (hook) 21A of the display unit 21 is engaged to the mounting stand 22. To this end, the hook position mark 26 may be controlled by the CPU 10 to be displayed at a predetermined location of the LCD 11 that substantially corresponds in height to the position where the engaging member 21A is joined to the housing of the display unit 21.

The mounting stand 22 may have position marks 23, 24 and 25 for indicating the positions of engaging holes 22A, 22B and 22C, which will be described later, in the mounting stand 22. The position marks 23, 24 and 25 may be positioned in the mounting stand 22 such that they are visible even when the display unit 21 is mounted on the mounting stand 22. The position marks 23, 24 and 25 may be positioned on the mounting stand 22 to be in substantial alignment with the respective engaging holes 22A, 22B and 22C. Those skilled in the art may readily appreciate that the positions of the position marks 23, 24 and 25 on the mounting stand 22 may be appropriately selected in line with the heights of the engaging holes 22A, 22B and 22C. In one embodiment, the position marks 23, 24 and 25 may include symbols, such as a triangle, an arrow, etc., and letters, such as "UP" (at the upper position), "M" (at the middle position) and "LO" (at the lower position). In one embodiment, the position marks 23, 24 and 25 may be inscribed, printed or alternatively embossed on the mounting stand 22.

When the LCD 11 displays a message, such as "PLEASE ADJUST DISPLAY UNIT TO LO," the user may detach the display unit 21 from the mounting stand 22 and may fit the display unit 21 to the mounting stand 22 such that the hook position mark 26 is aligned to the position mark 25 (LO). In this case, the user does not need to look at the back side of the display unit 21 to fit the display unit 21 to the mounting stand 22.

Figure 3:
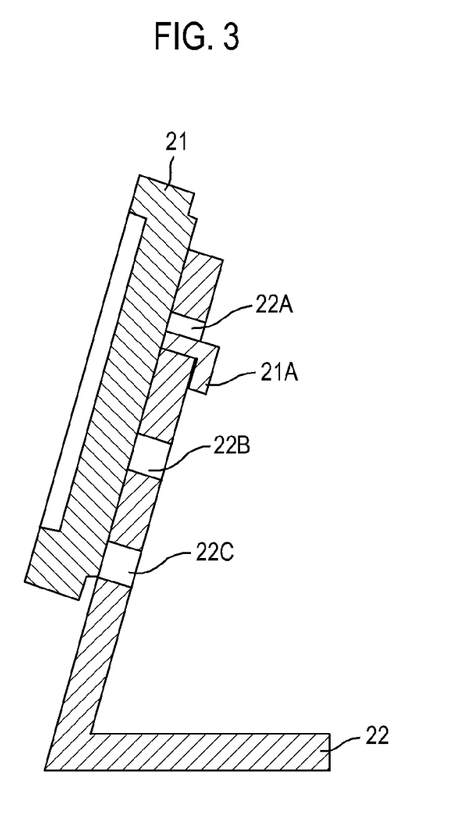
FIG. 3 is an illustrative embodiment of a side sectional view of the display device.

FIG. 3 is an illustrative embodiment of a side sectional view of the display device. As shown in FIG. 3, the display unit 21 may have the engaging member 21A. The engaging member 21A may be joined to the back side of the housing or alternatively may be integrally formed with the housing. While the engaging member 21A has been shown to be joined to the back side of the housing in the illustrated embodiment, those skilled in the art will readily appreciate that other embodiments are possible. Further, in one embodiment, the engaging member 21A may have an extended portion and a bent portion to form a hook shape.

The mounting stand 22 may include a support portion and a mount portion, on which the display unit 21 may be mounted, to form an L-shape. The mount portion may be backwardly inclined by a predetermined angle. The mounting stand 22 may have a plurality of engaging holes 22A, 22B and 22C for engagement to the engaging member 21A in the mount portion. The engaging holes 22A, 22B and 22C may be sized to allow the engaging member 21A to engage to and disengage from the engaging holes 22A, 22B and 22C. In one embodiment, the engaging holes 22A, 22B and 22C may be provided in the form of an aperture or opening.

Figure 4:
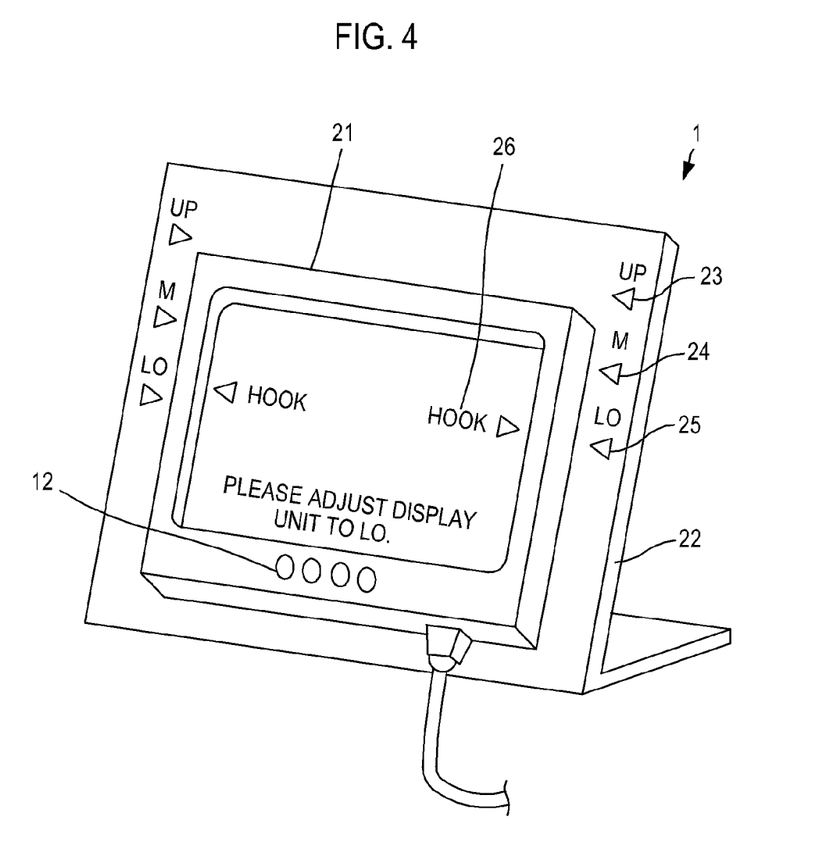
FIG. 4 is an illustrative embodiment of a front perspective view showing the display unit mounted on a mounting stand at a LO position.
Figure 5:
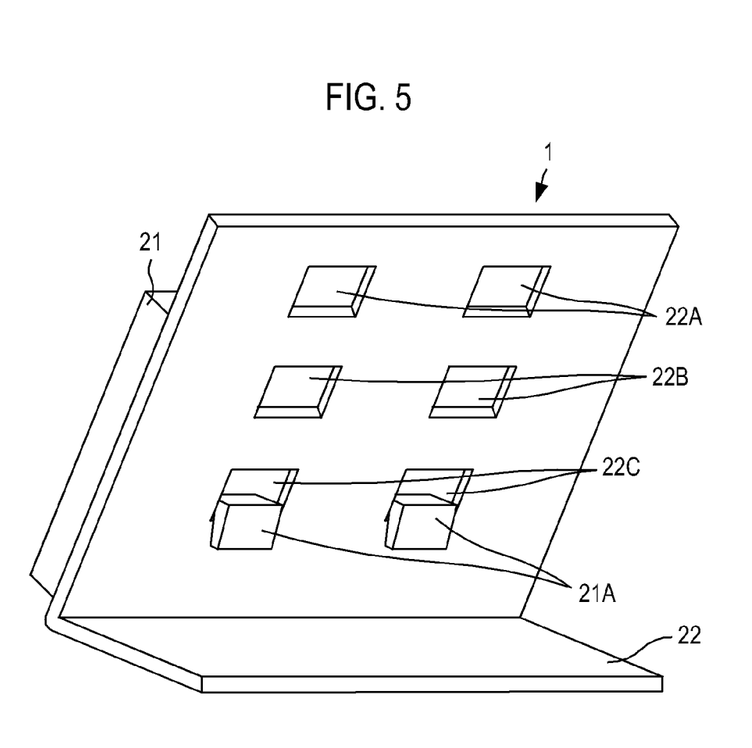
FIG. 5 is an illustrative embodiment of a back perspective view showing the display unit mounted on the mounting stand at a LO position.

FIG. 4 is an illustrative embodiment of a front perspective view showing the display unit mounted on a mounting stand at a LO position. FIG. 5 is an illustrative embodiment of a back perspective view showing the display unit mounted on the mounting stand at a LO position.

As shown in FIGS. 4 and 5, if the display unit 21 is adjusted to be mounted to the mounting stand 22 at the position of the position mark 25 (LO), the engaging member 21A may engage to the lower engaging hole 22C. If the display unit 21 is adjusted to be mounted to the mounting stand 22 at the position of the position mark 23 (UP), the engaging member 21A may engage the upper engaging hole 22A. Further, if the display unit 21 is adjusted to be mounted to the mounting stand 22 at the position of the position mark 24 (M), the engaging member 21A may engage the middle engaging hole 22B.

Figure 6:
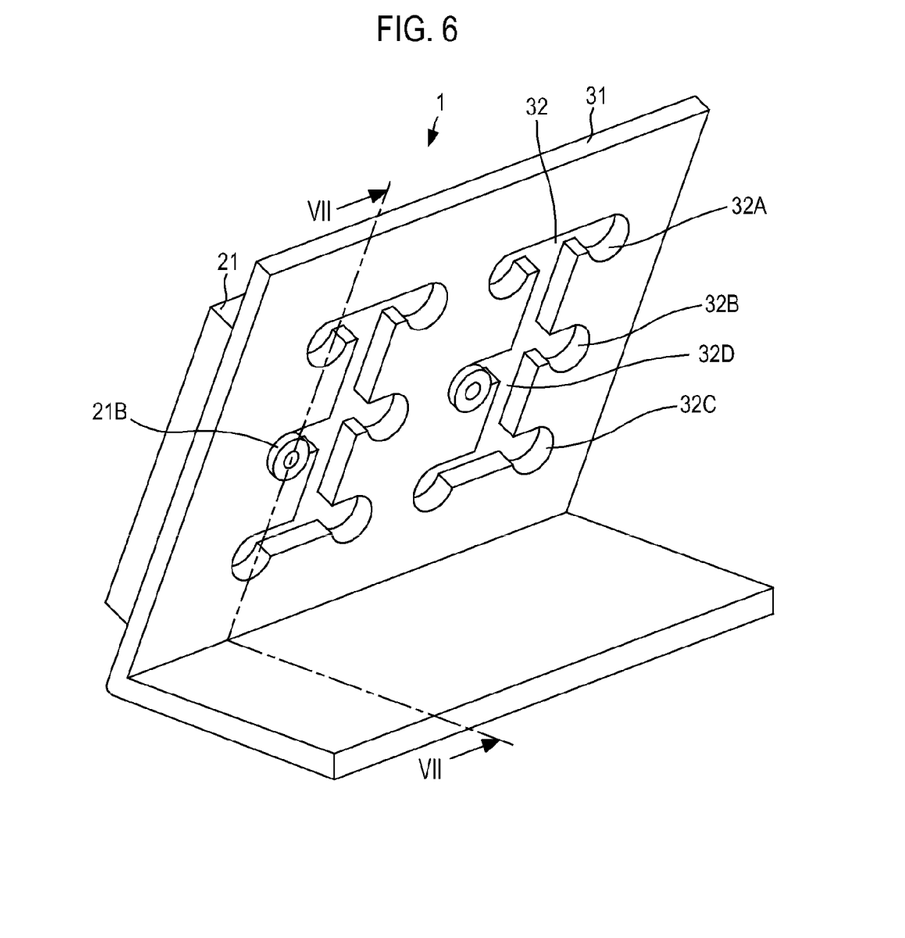
FIG. 6 is an illustrative embodiment of a back perspective view showing another embodiment of the display device.

FIG. 6 is an illustrative embodiment of a back perspective view showing another embodiment of the display device. As shown in FIG. 6, a mounting stand 31 may include, in the mount portion thereof, slide slots 32 instead of the engaging holes 22A, 22B and 22C.

In one embodiment, the slide slot 32 may include a longitudinal slot 32D and a plurality of transverse slots (engaging parts) 32A, 32B and 32C. The longitudinal slot 32D may be vertically cut away. The transverse slots 32A, 32B and 32C may be interconnected to the longitudinal slot 32D at different heights. Each of the transverse slots 32A, 32B and 32C may have a recess on its two lateral ends.

Figure 7:
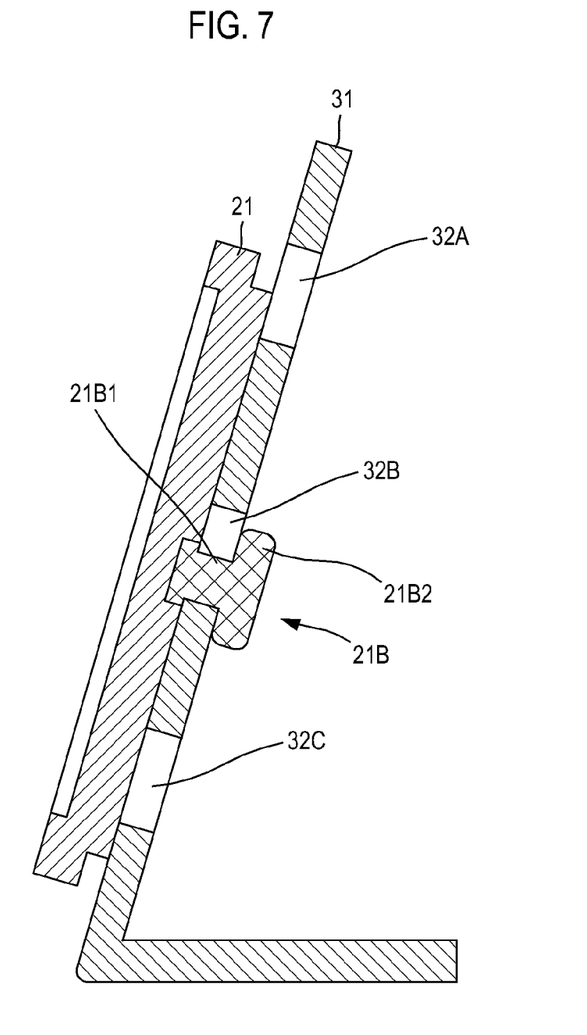
FIG. 7 is an illustrative embodiment of a sectional view taken along the line VII-VII in FIG. 6.

FIG. 7 is an illustrative embodiment of a sectional view taken along the line VII-VII in FIG. 6. As shown in FIG. 7, the display unit 21 may have an engaging member 21B. In one embodiment, the engaging member 21B may include a pin portion 21B1 and a flange portion 21B2 at the leading end of the pin portion 21B1. The pin portion 21B1 may have a diameter smaller than a width of the slide slot 32. The flange portion 21B2 may have a diameter greater than the width of the slide slot 32.

The mounting stand 31 may include a support portion and a mount portion, on which the display unit 21 may be mounted, to form an L-shape. The mount portion may be backwardly inclined by a predetermined angle. The pin portion 21B1 may be inserted to the slide slot 32 of the mounting stand 31. The pin portion 21B1 may be coupled to the display unit 21 at its one end. The flange portion 21B2 may be joined to the other end of the pin portion 21B1. In one embodiment, the flange portion 21B2 may be integrally formed with the pin portion 21B1. With this structure, the display unit 21 may be slidably movable along the slide slot 32. The pin portion 21B1 may be configured to fit to the recesses of the transverse slots 32A, 32B and 32C.

The mounting stand 31 may have the position marks 23, 24 and 25 for indicating the positions of the transverse slots 32A, 32B and 32C in the mounting stand 31. The position marks 23, 24 and 25 may be located in the mounting stand 31 such that they are visible even when the display unit 21 is mounted on the mounting stand 31. The position marks 23, 24 and 25 may be positioned on the mounting stand 31 to be in substantial alignment with the respective transverse slots 32A, 32B and 32C. In one embodiment, the position marks may include symbols, such as a triangle, an arrow, etc., and letters, such as "UP" (at the upper position), "M" (at the middle position) and "LO" (at the lower position).

When the LCD 11 displays a message, such as "PLEASE ADJUST DISPLAY UNIT TO LO," the user may slide the display unit 21 along the slide slot 32 of the mounting stand 31 and may fit the engaging member 21B of the display unit 21 to the transverse slot 32C such that the hook position mark 26 is aligned to the position mark 25 (LO). In this case, the user does not need to look at the back side of the display unit 21 to fit the display unit 21 to the mounting stand 31.

According to the display device of one embodiment described above, the display device 1 may include the display unit 21 and the mounting stand 21 or 31. The display unit 21 may include the engaging member 21A or 21B at its back side and the LCD 11 at its front side. The LCD 11 may display the hook position mark 26, when the hook position button 12 is pressed down. The mounting stand 22 or 31 may include the engaging parts 22A, 22B and 22C or 32A, 32B and 32C and the position marks 23, 24 and 25. The engaging parts may be provided at different heights. The engaging member 21A or 21B may engage to the engaging part. Accordingly, the user can adjust the height of the display unit 21 without having to look at the back side of the display unit 21.

While certain embodiments have been described, these embodiments have been presented by way of example only, and are not intended to limit the scope of the present disclosure. Indeed, the novel device and system described herein may be embodied in a variety of other forms; furthermore, various omissions, substitutions and changes in the form of the device and system described herein may be made without departing from the spirit of the present disclosure. The accompanying claims and their equivalents are intended to cover such forms or modifications as would fall within the scope and spirit of the present disclosure.

What is claimed is:

1. A display device comprising:
a display unit having a housing, a display panel housed at least partially within the housing, an engaging member joined to the housing at a first predetermined location and a processing unit configured to control the display panel to display a position indicator at a second predetermined location on the display panel substantially corresponding in height to the first predetermined location; and
a mounting stand having a plurality of engaging parts disposed at different heights for engagement with the engaging member and a plurality of position marks disposed at third predetermined locations on the mounting stand, the third predetermined locations being respectively at the different heights and the position marks being visible when the display unit is mounted on the mounting stand, and
wherein the display unit is mountable to the mounting stand in a manner that the position indicator displayed on the display panel is aligned to one of the position marks.

2. The device of claim 1, wherein the engaging member has a hook shape and each of the engaging parts includes a hole configured to allow the engaging member to engage thereto and disengage there from.

3. The device of claim 1, wherein the engaging member has a shape of a pin with a flange and each of the engaging parts includes a slide slot, the slide slot including a plurality of transverse slots disposed at the different heights and each having two lateral ends and a longitudinal slot interconnecting to the transverse slots and each of the transverse slots having a recess on each of the respective lateral ends, and wherein the engaging parts are configured so that the display unit is slidably movable along the engaging parts when mounted to the mounting stand.

4. The device of claim 3, wherein the engaging member is integrally formed with the housing.

5. A display system comprising:
a display device including:
a display unit having a housing, a display panel housed at least partially within the housing, an engaging member joined to the housing at a first predetermined location, a processing unit configured to control the display panel to display a position indicator at a second predetermined location on the display panel substantially corresponding in height to the first predetermined location and a hook position button provided on the housing, and
a mounting stand having a plurality of engaging parts disposed at different heights for engagement with the engaging member and a plurality of position marks disposed at third predetermined locations on the mounting stand, the third predetermined locations being respectively at the different heights and the position marks being visible when the display unit is mounted on the mounting stand;
a physique information database configured to store physique information in association with user IDs; and
an information processing device connected to the display device via an interface, the information processing device being configured to receive one of the user IDs, read out the physique information associated with the user ID from the physique information database and transmit the physique information to the display device,
wherein the processing unit of the display device is configured to control the display unit to display a message indicating a hook position corresponding to the physique information upon detection of a press-down of the hook position button, and
wherein the display unit is mountable to the mounting stand in a manner that the position indicator displayed on the display panel is aligned to one of the position marks.

6. The system of claim 5, wherein the information processing device is connected to a reader/writer configured to read and write data from and to a wireless tag storing a user ID and wherein the information processing device is further configured to receive the user ID from the reader/writer.

7. A display device comprising:
a display unit including a display panel, an engaging member and a processing unit configured to control the display panel to display a position indicator on the display panel; and
a mounting stand including a plurality of engaging parts disposed at different heights for engagement with the engaging member,
wherein the processing unit is configured to control the display panel to display the position indicator in a location corresponding to the engaging member, the display unit being mountable to the mounting stand in a manner so that the position indicator is aligned to one of the engaging parts, wherein the display unit further includes a housing and the display panel is housed at least partially within the housing, wherein the mounting stand further includes a plurality of position marks to respectively indicate the different heights at which the engaging parts are disposed, the position marks being visible when the display unit is mounted on the mounting stand, and wherein the display unit is mountable to the mounting stand in a manner that the position indicator is aligned to one of the position marks.

8. The device of claim 7, wherein the engaging member is joined to the housing.

9. The device of claim 8, wherein the engaging member is joined to a back side of the housing.

10. The device of claim 7, wherein the engaging member is integrally formed with the housing.

11. The device of claim 7, wherein the engaging member has an extended portion and a bent portion to form a hook shape.

12. The device of claim 7, wherein each of the engaging parts includes an opening configured to allow the engaging member to engage thereto and disengage there from.

13. The device of claim 7, wherein the display unit further includes a hook position button provided on the housing and the processing unit of the display unit is further configured to receive user information corresponding to a user ID, the user information comprising at least one of physique information and preference information, and control the display panel to display a message prompting to mount the display unit to the mounting stand so that the position indicator is aligned to one of the position marks corresponding to the user information upon detection of a press-down of the hook position button.

14. The device of claim 13, wherein the processing unit of the display unit is further configured to receive the user information corresponding to the user ID from an external device.

15. The device of claim 14, wherein the external device includes one selected from the group consisting essentially of a personal computer, a work station and a POS terminal.

16. The device of claim 14, wherein the external device is configured to receive the user ID from a user, obtain the user information corresponding to the user ID and transmit the user information to the processing unit.

17. The device of claim 14, wherein the external device is connected to a reader/writer configured to read and write data from and to a wireless tag storing the user ID and wherein the external device is configured to receive the user ID from the reader/writer, obtain the user information corresponding to the user ID and transmit the user information to the processing unit.

* * * * *